April 6, 1965 W. RUF 3,176,585
AMPHIBIOUS ARMOURED MOTOR VEHICLES
Filed May 8, 1963 2 Sheets-Sheet 1

Inventor
Walter Ruf
By Stevens, Davis, Miller & Mosher
Attorneys 3,176,585
AMPHIBIOUS ARMOURED MOTOR VEHICLES
Walter Ruf, Bottighofen, Thurgau, Switzerland, assignor to Firma Mowag, Motorwagenfabrik A.G., Kreuzilingen, Switzerland
Filed May 8, 1963, Ser. No. 278,969
Claims priority, application Switzerland, May 9, 1962, 5,545/62
7 Claims. (Cl. 89—36)

The invention relates to an amphibious armoured motor vehicle having an intenral combustion engine, four-wheel drive and at least one propeller for propulsion in water.

Amphibious armoured motor vehicles are known which have an armoured shell which is sealed against entry of water and in connection with which the weight of water displaced by the shell is greater than the weight of the vehicle. In such vehicles, the engine is arranged either above the front wheels or above the rear wheels. This means that the center of gravity of the vehicle is relatively high, which is unfavourable for use of the vehicle in water. Moreover, in the known vehicles the arrangement of the engine limits the space available for personnel or cargo.

It is an object of the present invention to provide an amphibious armoured motor vehicle having a low center of gravity.

It is a further object of the invention to provide an amphibious armoured motor vehicle which has a broad uninterrupted space for personnel or cargo.

It is another object of the invention to provide an amphibious armoured motor vehicle in which the engine is arranged between the shafts of the front wheels and rear wheels in such manner that the crankshaft of the engine extends transversely to the traveling direction of the vehicle.

These and other objects and advantages of the invention will be apparent from the following description given with reference to the accompanying diagrammatic drawings, which are given by way of example and in which.

Figure 1:
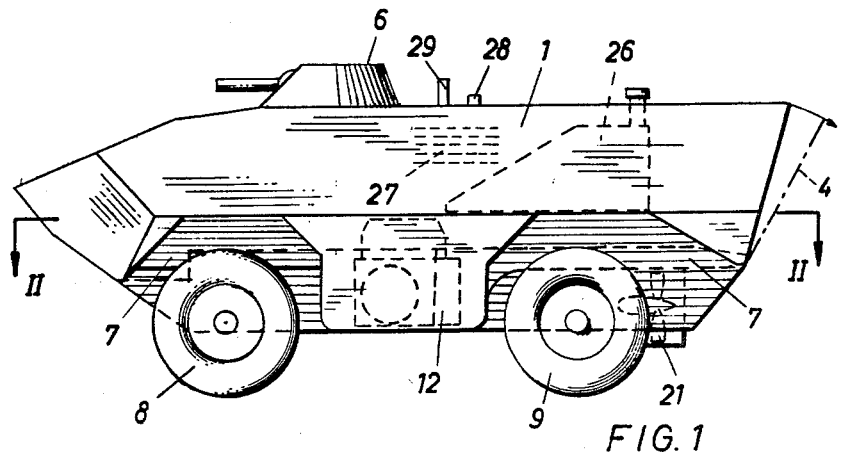
FIG. 1 is a side view of an amphibious armoured vehicles.
Figure 2:
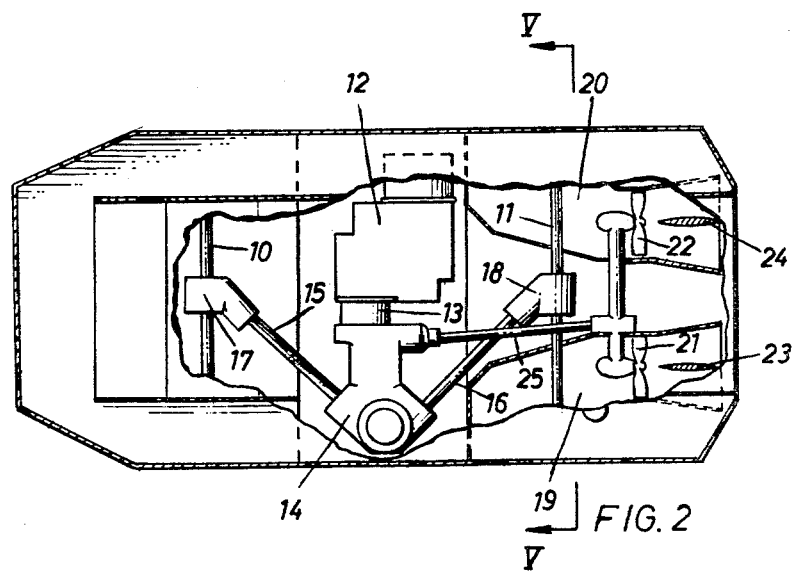
FIG. 2 is a sectional view along the line II—II of FIG. 1, partly broken away.
Figure 3:
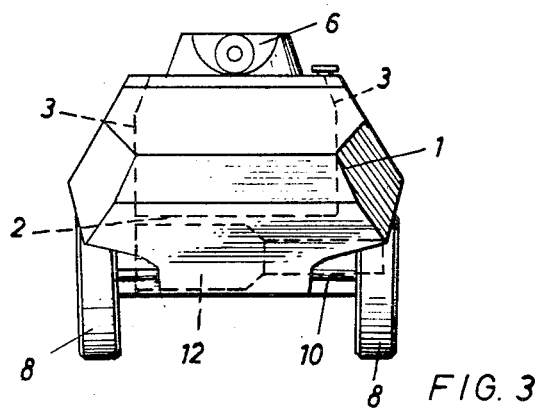
FIG. 3 is a front view of the vehicle.
Figure 4:
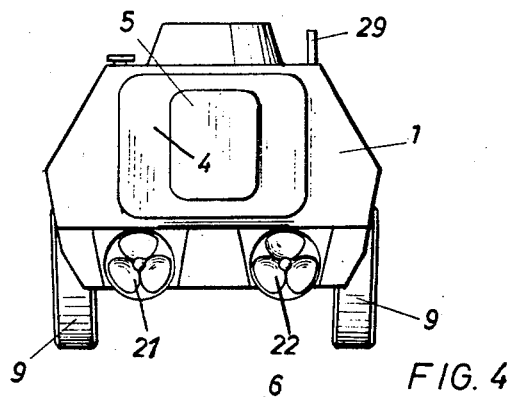
FIG. 4 is a rear view of the vehicle.
Figure 5:
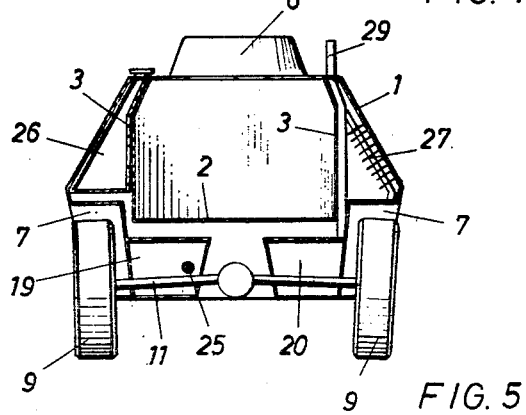
FIG. 5 is a sectional view along the line V—V of FIG. 2.

The vehicle comprises an armoured shell 1 which is sealed against entry of water and which displaces a volume of water the weight of which is greater than the weight of the vehicle. An intermediate floor 2 is provided in the shell 1 and, together with lateral walls 3, the floor 2 forms a continuous uninterrupted space space in the shell 1 for personnel and/or cargo. This space is completely free from any of the various aggregates or mechanisms necessary in the vehicle, this fact constituting a particular advantage.

At the rear end of the shell 1, a flap 4 is provided, the breadth of which corresponds substantially to the breadth of the abovementioned personnel or cargo space. After lowering the flap 4, the vehicle can be easily and rapidly loaded or unloaded. A door 5 is provided in the flap 4, allowing the passage of individual persons without the flap 4 itself having to be lowered.

The shell 1 is surmounted by a turret 6, in front of which an entry hatch (not shown) may be provided for the vehicle driver.

In each of the two longitudinal sides of the shell, recesses 7 which are spaced apart from each other are provided, which form housings for the front wheels 8 and the rear wheels 9. The front wheels 8 are driven by a shaft 10 and the rear wheels by a shaft 11.

Below the intermediate floor 2, and between the front wheels 8 and rear wheels 9, an engine 12 is provided, the engine lying at the lowermost part of the shell 1 so that its crankshaft (not shown) extends transversely to the traveling direction of the vehicle. The engine 12 drives a change-speed gear 14 through a clutch 13. The gear 14 has two output shafts 15 and 16 which drive the wheel shafts 10 and 11 through differential gears 17 and 18 respectively.

At the underside of the shell 1, recesses 19 and 20 are provided which are in communication with the recesses 7 for the rear wheels 9. The recesses 19 and 20 house screw propellers 21 and 22 and steering rudders 23 and 24, respectively, for use when the vehicle is traveling in water. The propellers 21 and 22 are driven by a shaft 25 which can be coupled to the engine 12 for rotation thereby, by the clutch 13.

The spaces between the lateral walls 3 and the shell 1 contain a fuel storage tank 26, a cooling unit 27, an exhaust pipe 28 and an air suction pipe, for the engine 12.

The embodiment described above is by way of example only. Modifications, omissions, additions and alterations are possible within the spirit and scope of the invention as defined in the following claims.

I claim:

1. An amphibious armoured motor vehicle comprising a water tight body, a set of front wheels and a set of rear wheels, side walls and an intermediate bottom, said walls and said bottom arranged in said body and forming a loading room in the upper part of said body, a driving engine including a crank shaft, a clutch, a gear member, said clutch being interconnected between said engine and said gear member, a front and a rear wheel shaft supporting said front and rear wheels, means to transmit output driving power of said gear member to said wheel shafts; said crank shaft, said clutch and said gear member being disposed in a substantially straight row between said front and said rear wheel shaft, said engine, said clutch, and said gear member having substantially one common axis extending substantially parallel to said front and rear wheel shaft and being arranged below said bottom at substantially the same level as said wheel axes.

2. A vehicle as set forth in claim 1, comprising furthermore at least one propeller, driving means to rotate said propeller and means for defining at least one first recess in the lower part of said body behind said rear wheel shaft, said propeller disposed in said recess.

3. A vehicle as set forth in claim 2, wherein means are provided to define a set of second recesses in said body, each of said front and said rear wheels being disposed in one of said recesses.

4. A vehicle according to claim 3, wherein said first recess receiving said propeller and said recesses of said set of second recesses receiving said rear wheels are formed as a common recess.

5. A vehicle as claimed in claim 2, further comprising at least one steering rudder, said steering rudder being disposed in said first recess receiving said propeller.

6. An amphibious armoured motor vehicle comprising an armoured shell sealed against entry of water and the weight of the volume of water displaced by which is greater than the weight of said vehicle, means forming two recesses at each longitudinal side of said shell, front and rear wheels arranged in said recesses, front and rear wheel shafts, an intermediate floor in said shell, a driving engine arranged below said intermediate floor and between said front and rear wheel shafts substantially at the same level as said wheel shafts, a drive shaft in said engine extending transversely to the traveling direction of said vehicle and parallel to said wheel shafts, a clutch connected to said drive shaft, two propellers spaced apart from each other at the underside of said shell, propeller shafts coupling the propellers with said clutch, a speed-change gear connected by said clutch to said engine, said engine, said clutch and said speed-change gear having a common axis being directed transversely to the traveling direction of said vehicle and parallel to said front and rear wheel shafts, secondary shafts operatively connecting said front and rear wheel shafts to said speed-change gear, said speed-change gear, said clutch and said secondary shafts being disposed in said shell below said intermediate floor.

7. A vehicle according to claim 6, wherein side walls of said shell are double walls defining therebetween a cavity, and a cavity, and a cooling aggregate and suction air and exhaust aggregates for said engine are disposed in said cavity.

References Cited by the Examiner
UNITED STATES PATENTS

| 1,317,323 | 9/19 | Schmidt | 89—36 |
| 2,397,791 | 4/46 | Kramer et al. | 115—1 |
| 2,400,132 | 5/46 | Porter | 115—1 |

BENJAMIN A. BORCHELT, *Primary Examiner.*